United States Patent [19]

Ide

[11] Patent Number: 4,976,589
[45] Date of Patent: Dec. 11, 1990

[54] OUTPUT CONTROL SYSTEM FOR AN I.C. ENGINE RESPONSIVE TO COMPRESSOR TORQUE AND ENGINE SPEED

[75] Inventor: Yutaka Ide, Wako, Japan

[73] Assignee: Honda Giken Kogyo K.K. (Honda Motor Co., Ltd. in English), Tokyo, Japan

[21] Appl. No.: 339,132

[22] Filed: Apr. 14, 1989

[30] Foreign Application Priority Data

Apr. 22, 1988 [JP] Japan .................................. 63-99764
Aug. 9, 1988 [JP] Japan ................................. 63-198385

[51] Int. Cl.⁵ ...................... F04B 17/06; F02M 23/06; F02M 23/08; F02M 23/10
[52] U.S. Cl. ....................................... 417/34; 417/22; 62/323.4; 123/339; 123/350
[58] Field of Search .................. 417/34, 18, 22, 222 S, 417/222; 62/323.4, 228.5, 115; 123/339, 350

[56] References Cited

U.S. PATENT DOCUMENTS

| | | | |
|---|---|---|---|
| 4,132,086 | 1/1979 | Kountz | 417/222.5 |
| 4,496,286 | 1/1985 | Gagnon | 417/34 |
| 4,681,025 | 7/1987 | Yamato et al. | 123/339 |
| 4,700,674 | 10/1987 | Iwata | 123/339 |
| 4,856,291 | 8/1989 | Takahashi | 62/323.4 |

Primary Examiner—Leonard E. Smith
Assistant Examiner—David W. Scheuermann
Attorney, Agent, or Firm—Arthur L. Lessler

[57] ABSTRACT

An output control system for an internal combustion engine for an automotive vehicle having a variable capacity type compressor installed therein and driven by the engine, in which the output torque of the engine is increased by means of an engine output incremental value in response to operation of the compressor. Load torque produced by the compressor is detected through the piston stroke and discharge pressure of the compressor, and the engine output incremental value is set depending on the detected load torque. The engine output incremental value is also set depending on the engine rotation speed.

16 Claims, 9 Drawing Sheets

OUTPUT CONTROL SYSTEM FOR AN I.C. ENGINE RESPONSIVE TO COMPRESSOR TORQUE AND ENGINE SPEED

BACKGROUND OF THE INVENTION

This invention relates to an output control system for internal combustion engines for use in automotive vehicles and more particularly to an output control system of this kind which is intended to properly control the output torque of the engine in response to the operation of a variable capacity compressor driven by the engine.

Conventionally, output control systems for internal combustion engines for use in automotive vehicles are known, e.g. by Japanese Provisional Patent Publication (Kokai) No. 57-56645 and Japanese Provisional Patent Publication (Kokai) No. 62-41951 in which the amount of intake air is controlled in a feedback manner to maintain the idling engine rotational speed at a desired value when the engine is at idle, while at the same time the amount of intake air is varied depending upon the operation of a compressor for air-conditioning so that the desired idling engine rotational speed may be maintained even during operation of the compressor, which acts as load on the engine. Specifically, according to Japanese Kokai No. 57-566445, the intake air amount is increased or decreased by a predetermined amount in response to turning-on or -off of an electromagnetic switch for connecting or disconnecting the compressor to or from the engine. On the other hand, according to Japanese Kokai No. 62-41951, the intake air amount is varied in response to the discharge pressure of the compressor.

However, the above conventional control systems have the inconvenience that when they are applied to a compressor of variable capacity type, the intake air amount cannot be determined in response to operating conditions of the compressor, and therefore the idling engine rotational speed cannot be properly controlled, which results in increased fuel consumption, engine stalling, etc.

Figure 1:
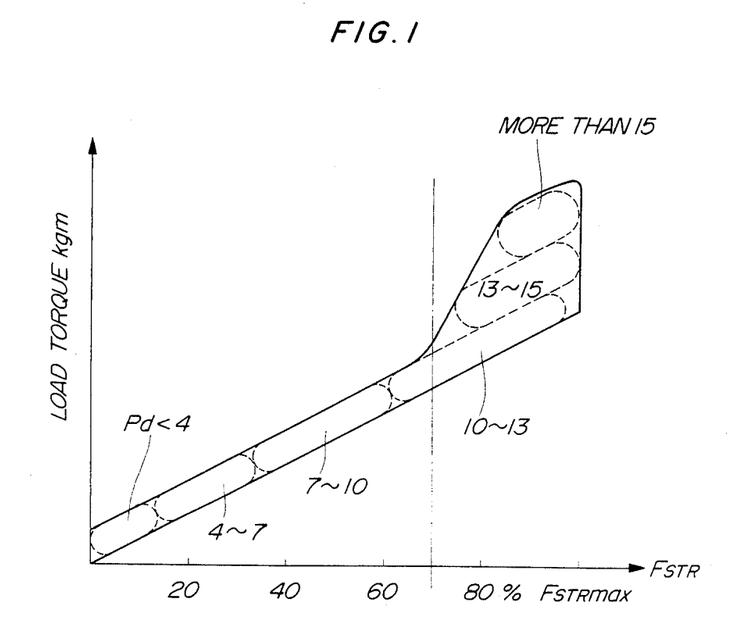
FIG. 1 is a graph showing the relationship between the stroke and discharge pressure of a variable capacity type compressor and the load torque.

FIG. 1 shows an example of characteristic of load acted on the engine by the compressor for driving same (hereinafter simply referred to as "load torque"), of which the capacity is variable depending on the stroke of its pistons. In the figure, the numerals 4–15 represent values of the discharge pressure Pd, and the broken lines enclosing the numerals indicate the distribution ranges of the discharge pressure Pd values plotted with respect to the stroke $F_{STR}$. Insofar as the engine rotational speed is constant, the stroke $F_{STR}$ varies depending upon the relationship between suction pressure of refrigerant drawn into the compressor and discharge pressure Pd of refrigerant being discharged from the compressor. Therefore, the load torque raries in response to the stroke $F_{STR}$ and the discharge pressure Pd, as shown in the figure. According to the figure, the stroke $F_{STR}$ varies with the discherge pressure up to 70% to 80% of the maximum capacity of the compressor, and accordingly the load torque is increased in proportion to the stroke $F_{STR}$. In the range where the load torque is even higher, it varies depending on both the stroke $F_{STR}$ and the discharge pressure Pd. Therefore, even if the engine output is increased in response to operation of the compressor by a predetermined degree or in accordance with the discharge pressure alone as in the above conventional control systems, it is impossible to fully respond to variation in the load torque and hence set the amount of intake air to a proper value.

In the meanwhile, the load torque not only varies with the stroke of pistons and the discharge pressure but also varies almost in proportion to the engine rotational speed. Therefore, even if the operation of the compressor undergoes change under the same operating conditions, the amount of variation of the load torque resulting from the change is different if the engine rotational speed is different. That is, the higher the engine rotational speed, the greater the amount of variation of the load torque.

Therefore, when the engine is operating in a region where the engine rotational speed is higher than the idling engine rotational speed while the compressor is in operation, if the incremental value of intake air amount is set based upon the piston stroke and the discharge pressure alone, the intake air amount becomes insufficient, which in turn results in insufficient output torque of the engine. As a result, torque shock may occur when the operation of the engine is started or the capacity thereof is increased. Further, the engine rotational speed may abnormally fluctuate; for instance, when the vehicle is cruising, the engine rotational speed may drop upon start of the compressor to make it difficult for the vehicle to run at a constant speed.

SUMMARY OF THE INVENTION

It is an object of the invention to provide an output control system for an internal combustion engine, which is capable of properly controlling the engine output in response to actual operating conditions of the compressor of variable capacity type throughout the whole operating range thereof to thereby improve fuel consumption, prevent engine stalling, etc.

It is another object of the invention to provide an output control system for an internal combustion engine, which is capable of properly controlling the engine output in response to actual operating conditions of the compressor of variable capacity type throughout the whole range of the engine rotational speed to thereby prevent torque shock or abnormal fluctuation of the engine rotational speed.

According to the invention, there is provided an output control system for an internal combustion engine for an automotive vehicle having a compressor installed therein and driven by the engine, the compressor having capacity thereof being variable, the output control system having engine output-increasing means for increasing output torque of the engine by means of an engine output incremental value in response to operation of the compressor. The system according to a first aspect of the invention is characterized by comprising:

load torque-detecting means for detecting load torque produced by the compressor; and incremental value-setting means for setting the engine output incremental value outputted from the engine output-increasing means, depending on output from the load torque-detecting means.

The system according to a second aspect of the invention is characterized by comprising:

load torque-detecting means for detecting load torque produced by the compressor;

engine rotational speed-detecting means for detecting the rotational speed of the engine; and incremental value-setting means for setting the engine output incremental value outputted from the engine output-increasing means, depending on output from the load torque-detecting means and output from the engine rotational speed-detecting means.

In both the first and second aspects of the invention, preferably, the load torque-detecting means comprises stroke-detecting means for detecting the stroke of the pistons of the compressor.

Further preferably, the load torque-detecting means comprises stroke-detecting means for detecting the stroke of the pistons of the compresser, and discharge pressure-detecting means for detecting discharge pressure of the compressor.

Still more preferably, the incremental value-setting means sets the engine output incremental value in accordance with the stroke of the pistons when the stroke of the pistons is smaller than a predetermined value.

Further preferably, the incremental value-setting means sets the engine output incremental value in accordance with the stroke of the pistons when the stroke of the pistons is smaller than a predetermined value, and in accordance with the discharge pressure of the compressor when the stroke of the pistons is equal to or greater than the predetermined value, respectively.

In the second aspect of the invention, preferably, the incremental value-setting means sets the engine output incremental value to a greater value as the engine rotational speed detected by the engine rotational speed-detecting means is higher.

The above and other objects, features, and advantages of the present invention will become more apparent from the ensuing detailed description taken in conjunction with the accompanying drawings.

DETAILED DESCRIPTION

The output control system of the invention will now be described in detail with reference to the drawings showing embodiments thereof.

Figure 2:
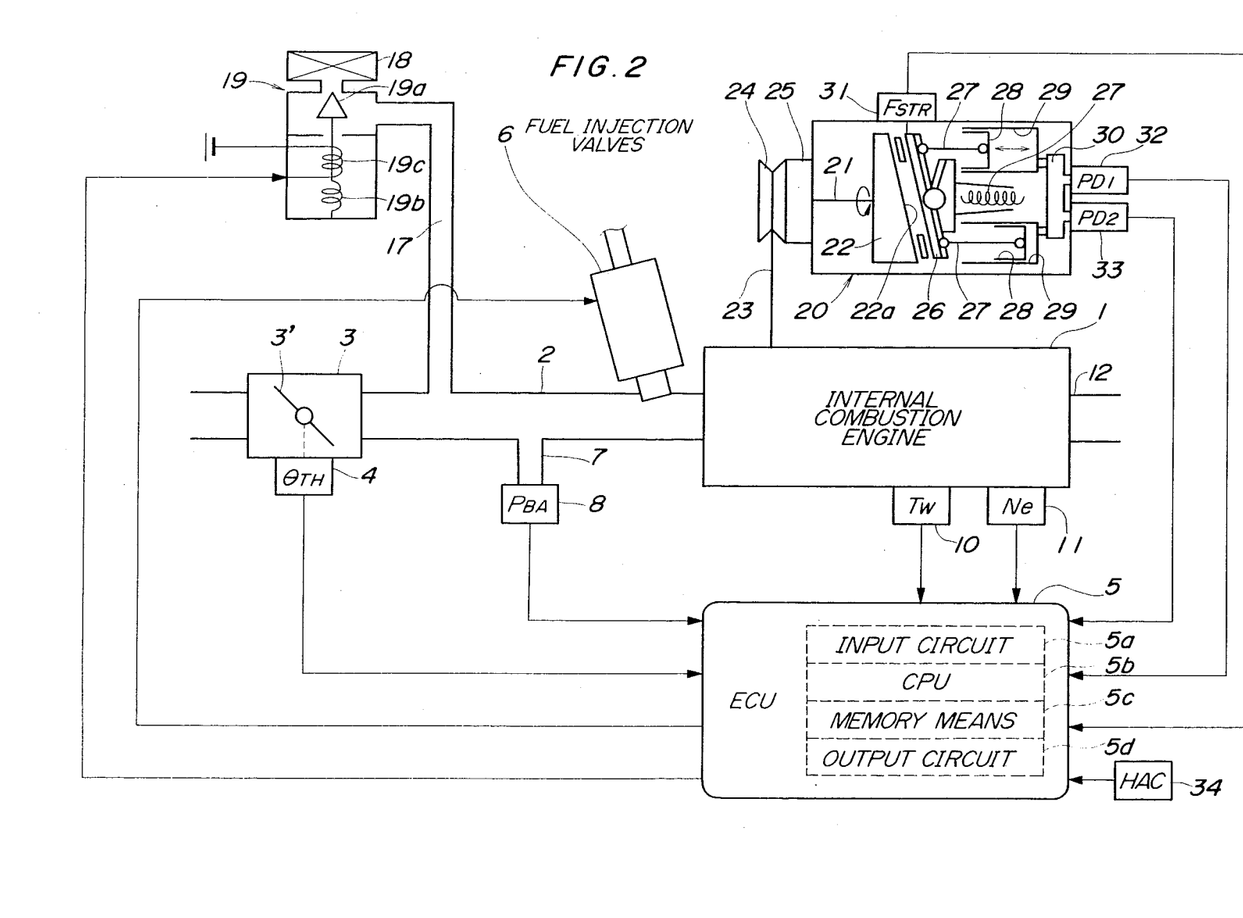
FIG. 2 is a schematic diagram showing the whole arrangement of a fuel supply control control system incorporating an output control system according to the invention.

Referring first to FIG. 2, there is shown the whole arrangement of a fuel supply control system incorporating an output control system according to the invention, i.e. a system for controlling the amount of intake air. In the figure, reference numeral 1 designates an internal combustion engine which may be a four-cylinder four-stroke-cycle type, for instance. An intake pipe 2 and an exhaust pipe 12 are connected to the cylinder block of the engine. Arranged across the intake pipe 2 at an intermediate portion thereof is a throttle body 3 accommodating a throttle valve 3' therein. A throttle valve opening ($\theta_{TH}$) sensor (hereinafter referred to as "the $\theta_{TH}$ sensor") 4 is connected to the throttle valve 3' for generating an electric signal indicative of the sensed throttle valve opening and supplying same to an electronic control unit (hereinafter referred to as "the ECU") 5.

Fuel injection valves 6, only one of which is shown, are inserted into the interior of the intake pipe at locations intermediate between the cylinder block of the engine 1 and the throttle body 3 and slightly upstream of respective intake valves, not shown, of respective cylinders. The fuel injection valves 6 are connected to a fuel pump, not shown, and electrically connected to the ECU to have their valve opening periods controlled by signals therefrom.

An air passage 17 is connected to the intake pipe 2 at a location between the fuel injection valves and the throttle body 3, and communicates the interior of the intake pipe 2 with the atmosphere. The air passage 17 has an air cleaner 18 mounted on one end thereof opening into the atmosphere. An auxiliary air control valve 19 is arranged across the air passage. The auxiliary air control valve 19 is a normally closed type proportional electromagnetic valve which comprises a valve body 19a disposed to vary the opening area of the air passage 17 in a continuous manner, a spring 19b urging the valve body 19a in a direction of closing same, and a solenoid 19c for moving the valve body 19a against the force of the spring 19b in a direction of opening the valve 19 when energized. The amount of current to be supplied to the solenoid 19c of the auxiliary air control valve 19 is controlled by the ECU 5 such that the air passage 17 has opening areas conforming to operating conditions of the engine and load on the engine.

An absolute pressure sensor (hereinafter referred to as "the $P_{BA}$ sensor") 8 for detecting absolute pressure $P_{BA}$ within the intake pipe 2 is connected through a pipe 7 to the interior of the intake pipe at a location between the fuel injection valves 6 and the air passage 17. The $P_{BA}$ sensor supplies an electric signal indicative of the detected absolute pressure $P_{BA}$ to the ECU 5.

An engine coolant temperature sensor (hereinafter referred to as "the $T_W$ sensor") 10, which may be formed of a thermistor or the like, is mounted in the cylinder block of the engine 1 in a manner embedded in the peripheral wall of an engine cylinder having its interior filled with coolant, to detect engine coolant temperature ($T_W$) and supply an electrical signal indicative of the detected engine coolant temperature to the ECU 5. An engine rotational speed sensor (hereinafter referred to as "the Ne sensor") 11 as engine rotational speed-detecting means is arranged in facing relation to a camshaft, not shown, of the engine 1 or a crankshaft, not shown, of same. The Ne sensor is adapted to generate a pulse of a top-dead-center position (TDC) signal (hereinafter referred to as "the TDC signal") at one of predetermined crank angles of the engine, i.e., at a crank angle position of each cylinder which comes a predetermined crank angle earlier relative to the top-dead-center position (TDC) at which the suction stroke thereof starts, whenever the engine crankshaft rotates through 180 degrees. The TDC signal pulse generated by the Ne sensor is supplied to the ECU 5.

A compressor 20 is connected to the engine 1, which compresses refrigerant used for air-conditioning. The compressor 20, which is a variable capacity wobble plate type, has a drive shaft 21, and a rotating member 22 rigidly mounted thereon. The drive shaft 21 is connected to the engine 1 through an electromagnetic clutch 25, a pulley 24, and a belt 23. The rotating member 22 has an inclined face 22a formed on a side remote from the drive shaft 21. A wobble plate 26, which is urged by a spring 27, is in slidable contact with the inclined face 22. Pistons 28 are connected to the wobble plate 26 through respective piston rods 27, and reciprocate within respective cylinders 29 to thereby draw in and compress refrigerant. More specifically, when the electromagnetic clutch 25 is in the connecting state, the rotation of the engine 1 is transmitted to the drive shaft 21 and rotating member 22, and converted into wobbling movement of the wobble plate 26 and then into reciprocating movement of the pistons 28, whereby refrigerant is drawn through a suction chamber, not shown, into cylinders 29, and compressed therein to be delivered into a condenser, not shown, through a discharge chamber 30. In the meanwhile, the angularity or inclination of the wobble plate 26 is controlled by varying the balance between the suction pressure and discharge pressure Pd of refrigerant to thereby control the stroke $F_{STR}$ of the pistons 28, i.e., the capacity of the compressor 20. Connected to the wobble plate 26 is a stroke sensor (hereinafter referred to as "the $F_{STR}$ sensor") 31 as load torque-detecting means, which detects the stroke $F_{STR}$ of the pistons 28, and supplies a signal indicative of the detected stroke $F_{STR}$ to the ECU 5. Further, a $PD_1$ switch 32 and a $PD_2$ switch 33 also serving as load torque-detecting means are arranged in the discharge chamber 30 for detecting pressure within the discharge chamber 30, i.e., discharge pressure Pd. The $PD_1$ switch 32 is adapted to be closed (ON) when the discharge pressure Pd is higher than a first predetermined value $PD_1$ (e.g. 9 kg/cm$^2$), and the $PD_2$ switch 33 is adapted to be closed (ON) when the discharge pressure Pd is higher than a second predetermined value $PD_2$ (e.g. 14 kg/cm$^2$). Signals indicative of the ON/OFF states of the respective switches are supplied to the ECU 5.

The ECU 5 comprises an input circuit 5a having functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b and for storing results of calculations therefrom, etc., and an output circuit 5d which outputs driving signals to the auxiliary air control valve 19 and the fuel injections valves 6, respectively.

In first and second embodiments of the invention described hereinafter, the ECU 5 forms engine output-increasing means and incremental value-setting means.

The CPU 5b operates in response to the above-mentioned parameter signals from the sensors and switches to determine operating conditions of the engine as well as operating conditions of the compressor 20, and calculates, based on the determined operating conditions of the engine and the determined operating conditions of the compressor 20, a valve opening command value ICMD for the auxiliary air control valve 19 in synchronism with inputting of TDC signal pulses to the ECU 5. A driving signal indicative of the calculated valve opening command value ICMD is supplied through the output circuit 5d to the solenoid 19c of the auxiliary air control valve 19 to drive same.

The CPU 5b also operates in accordance with a control program, not shown, to determine operating conditions of the engine 1 from the above-mentioned signals from the sensors, and calculate, based upon the determined operating conditions, the valve opening period or fuel injection period $T_{OUT}$ over which the fuel injection valves 6 are to be opened, by the use of the following equation in synchronism with inputting of TDC signal pulses to the ECU 5:

$$T_{OUT} = Ti \times K_1 + K_2 \quad (1)$$

where Ti represents a basic value of the fuel injection period $T_{OUT}$ of the fuel injection valves 6, which is determined based upon the engine rotational speed Ne and the intake pipe absolute pressure $P_{BA}$.

$K_1$ and $K_2$ are correction coefficients and correction variables, respectively, which are calculated based on various engine parameter signals to such values as to optimize characteristics of the engine such as fuel consumption and accelerability in response to operating conditions of the engine.

Figures 3, 3C:
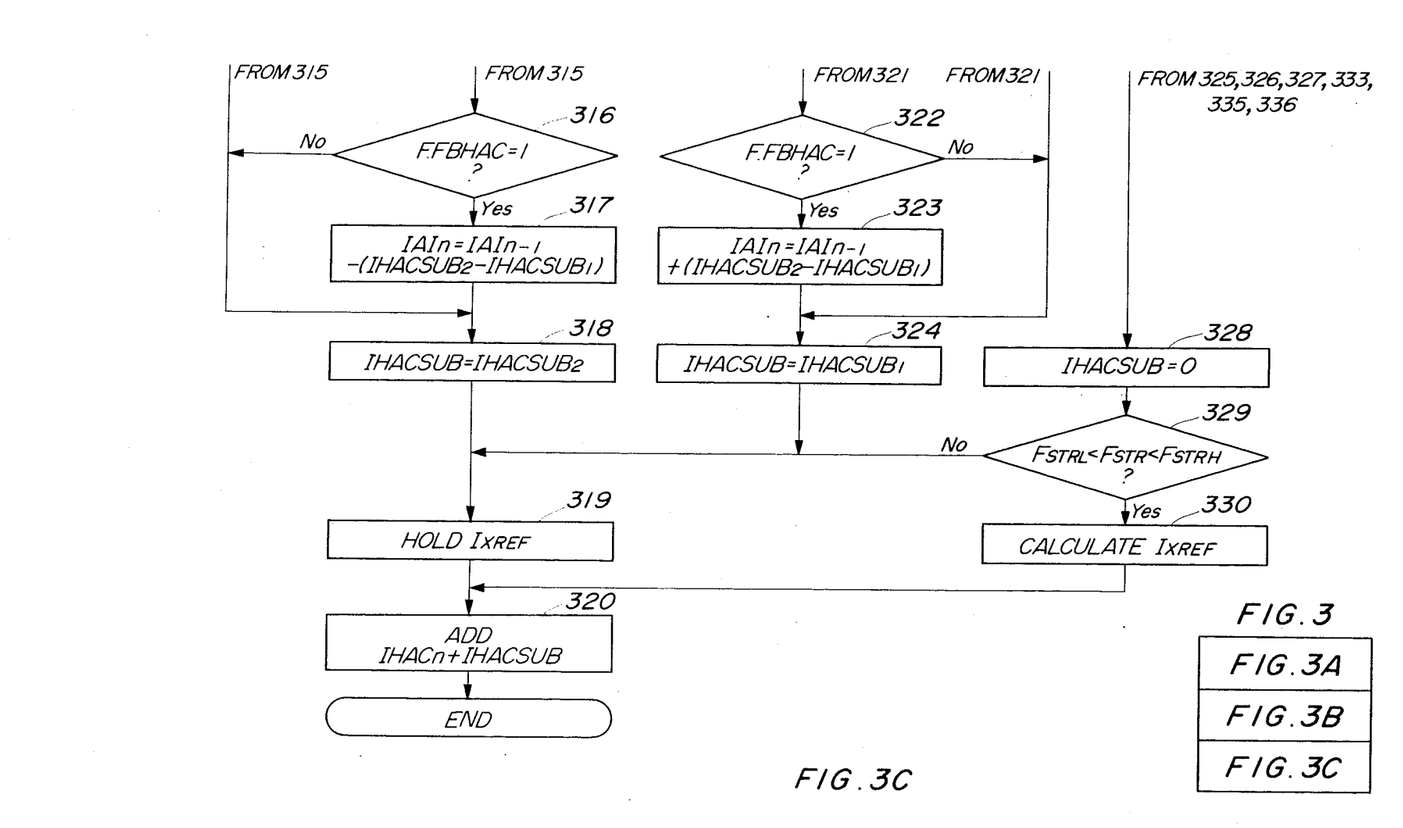
FIG. 3 is a flowchart of a subroutine for calculating a valve opening command value ICMD during feedback control according to a first embodiment of the invention.
Figure 3A:
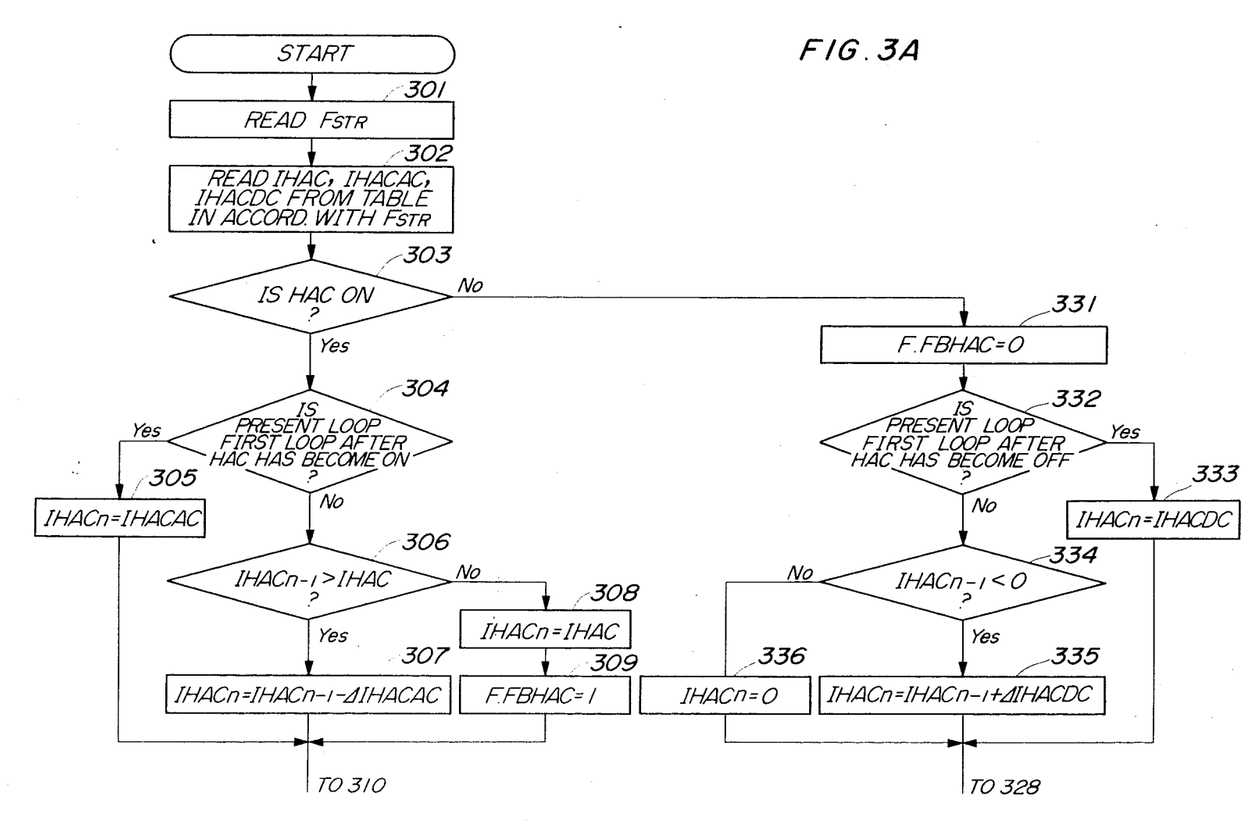
Figure 3B:
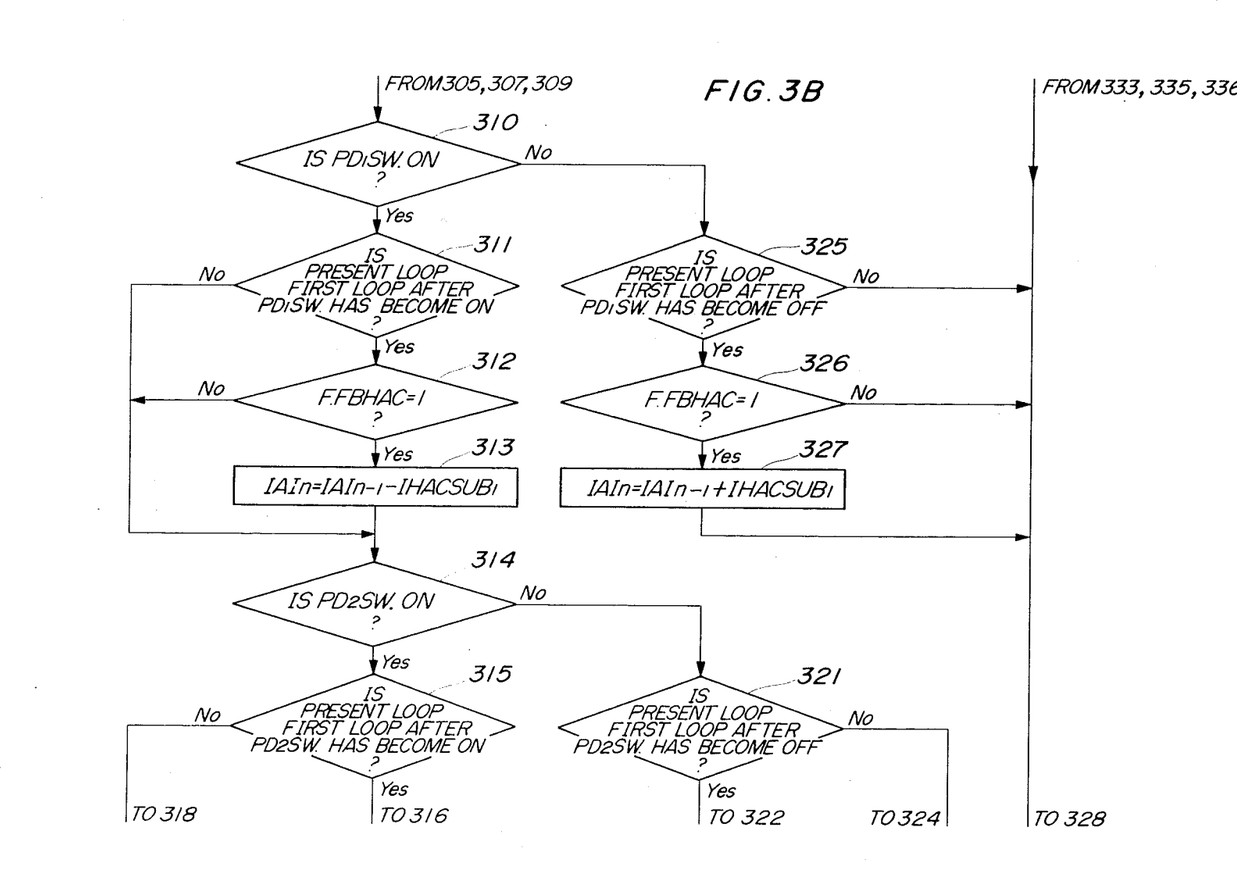

FIG. 3 shows a flowchart of a subroutine according to the first embodiment of the invention for calculating the valve opening command value ICMD when the engine 1 is in a predetermined idling condition under which the engine is controlled in a feedback manner. This program is executed in synchronsim with inputting of each TDC signal pulse to the ECU 5.

Figure 4:
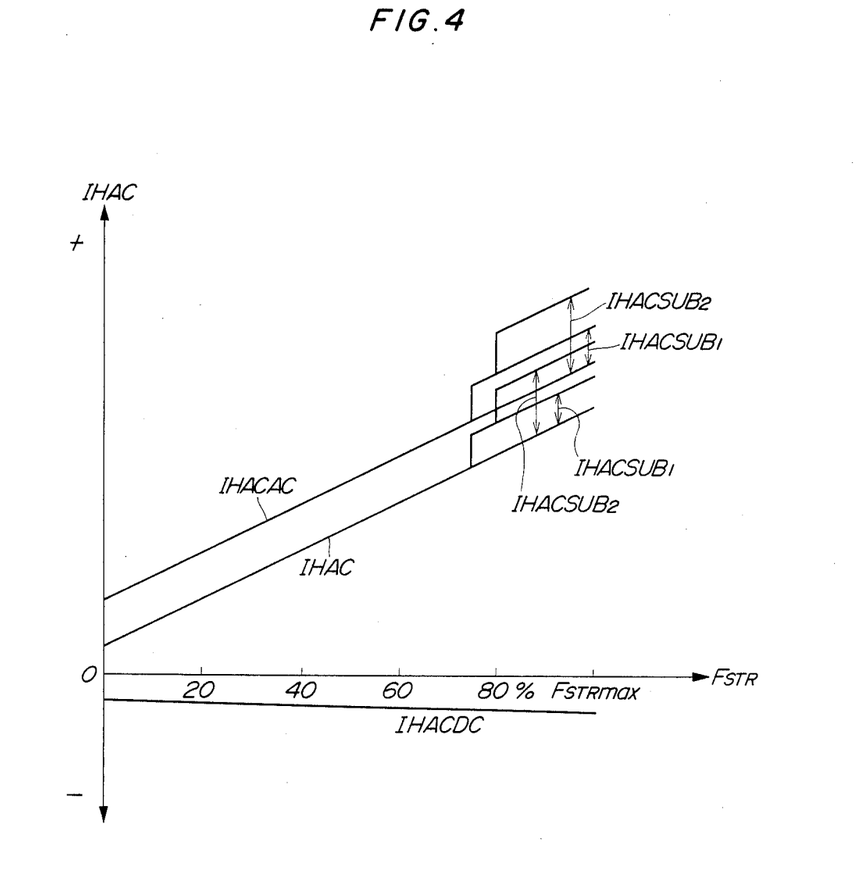
FIG. 4 is a diagram illustrating a table of an air-conditioner load term applied in executing the subroutine of FIG. 3.

First, the stroke of a piston 28 (hereinafter simply referred to as "the stroke") $F_{STR}$ is read at a step 301. Then at a step 302, first to third predetermined values IHAC, IHACAC, and IHACDC to be applied, as described hereinafter, in setting an air-conditioner load term $IHAC_n$ for use in calculation of the valve opening command value ICMD are read out in accordance with the stroke $F_{STR}$ read at the step 301 from a table stored in the memory means 5c. FIG. 4 shows the table, wherein the first and second predetermined values IHAC and IHACAC are positive values, whereas the third predetermined value IHACDC is a negative value. The absolute value of each value is proportional to the stroke $F_{STR}$, with the second predetermined value IHACAC being greater than the first predetermined value IHAC with respect to the same stroke $F_{STR}$. As shown in the figure, in the region where the stroke $F_{STR}$ is greater than 70 to 80%, an incremental term IHACSUB (IHACSUB$_1$, IHACSUB$_2$), referred to hereinafter, for use when the discharge pressure is high, is added to the first and second predetermined values IHAC and IHACAC as the discharge pressure is increased.

Figure 5:
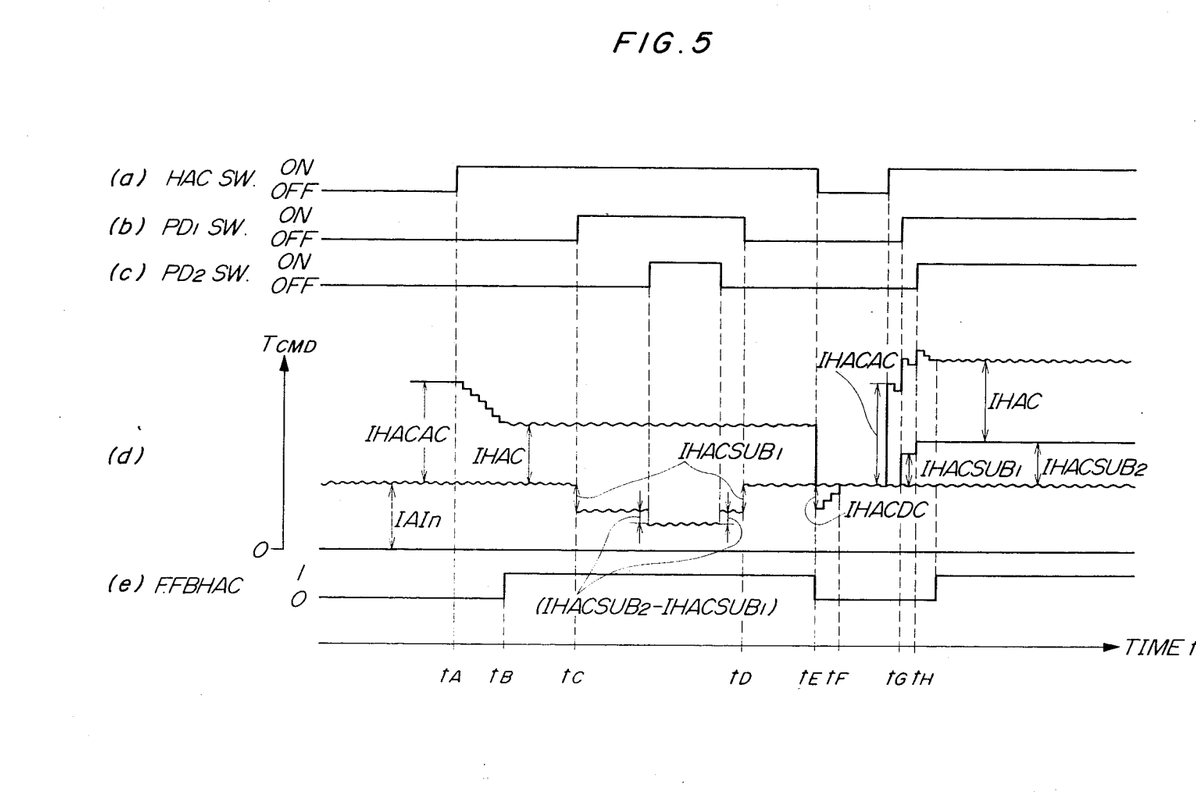
FIG. 5 is a timing chart showing, by way of example, a change in the valve opening command value ICMD produced by the output control system.

Then, it is determined at a step 303 whether or not a HAC switch 34 is ON, i.e., whether or not the compressor 20 is being driven by the engine 1. If the answer to the question at the step 303 is Yes, it is determined at a step 304 whether or not the present loop is the first loop after the HAC switch 34 has been turned on. If the answer to the question of the step 304 is Yes, the air-conditioner load term $IHAC_n$ is set to the second predetermined value IHACAC (at time point $t_4$ in FIG. 5), and then the program proceeds to a step 310 referred to hereinafter. In other words, the air-conditioner load term $IHAC_n$ is set to the greater value IHACAC immediately after the HAC switch 34 is turned on and at the same time the electromagnetic clutch 25 becomes engaged to connect the engine 1 with the compressor 20. By thus setting the air-conditioner load term $IHAC_n$, it is possible to increase the amount of intake air in response to increased load on the engine resulting from the connection of the engine 1 with the compressor 20 to thereby prevent a drop in the idling rotational speed.

If the answer to the question of the step 304 is No, i.e., if the present loop is not the first loop after the HAC switch 34 has become ON, it is determined at a step 306 whether or not the air-conditioner load term value $IHAC_{n-1}$ applied in the immediately preceding loop is greater than the first predetermined value IHAC. If the answer to the question of the step 304 is Yes, i.e., if $IHAC_{n-1} > IHAC$, the air-conditioner load term $IHAC_n$ of the present loop is set to a value obtained by subtracting a predetermined value $\Delta IHACAC$ from the air-conditioner load term value $IHAC_{n-1}$ of the immediately preceding loop at a step 307, and then the program proceeds to the step 310 referred to hereinafter. If the answer to the question of the step 306 is No, i.e., if $IHAC_{n-1} \leq IHAC$, the air-conditioner load term $IHAC_n$ of the present loop is set to the first predetermined value IHAC at a step 308, a flag F.FBHAC is set to 1 at a step 309, and then the program proceeds to the step 310. The flag F.FBHAC is set to 0 at a step 331 referred to hereinafter on condition that the HAC switch 34 is OFF.

Thus, the air-conditioner load term IHACn, which was set to the second predetermined value IHACAC immediately after the HAC switch 34 was turned on, is gradually decreased so long as the HAC switch 34 keeps ON (during time period $t_A$ to $t_B$ in FIG. 5) until the term IHACn reaches the first predetermined value IHAC. Once the first predetermined value IHAC has been reached, the intake air supply by feedback control is regarded as already stable after a predetermined time period has elapsed from the start of operation of the compressor 20, and the air-conditioner load term IHACn is held at the value IHAC while the flag F.FBHAC being set to 1 (after $t_B$ in FIG. 5).

As previously stated with reference to FIG. 1, load torque on the engine 1 produced by operation of the compressor 20 is proportional to the stroke $F_{STR}$ when the latter is smaller than a value indicated by the one dot-chain line. Therefore, when the compressor 20 is in operation, the air-conditioner load term $IHAC_n$ is set based on the first and second predetermined values IHAC and IHACAC set as described above, and applied as an additive term in calculating the valve opening command value ICMD as described below, whereby it is possible to increase the amount of intake air in response to increase in the load torque resulting from the operation of the compressor 20 to thereby prevent abnormal decrease in the engine rotational speed and even engine stalling.

At the step 310, it is determined whether or not the $PD_1$ switch 32 is ON, i.e., whether or not the discharge pressure Pd is higher than the first predetermined value $PD_1$ referred to above. If the answer to the question of the step 310 is Yes, it is determined at a step 311 whether or not the present loop is the first loop after the $PD_1$ switch has been turned on, and if the answer to the question of the step 311 is Yes, it is further determined at a step 312 whether or not the flag F.FBHAC has been set to 1. If the answer to the question of the step 312 is Yes, the integral control term $IAI_n$ of the present loop for use in calculation of the valve opening command value ICMD is set to a value obtained by subtracting a first incremental term value $IHACSUB_1$ from the integral control term $IAI_{n-1}$ of the immediately preceding loop (step 313), and then the program proceeds to a step 314 referred to hereinbelow. If either one of the answers to the questions of the steps 311 and 312 is No, i.e., if the present loop is not the first loop after the $PD_1$ switch has become ON or if the flag F.FBHAC has been set to 0, the program jumps to the step 314 without executing the step 313. Thus, the step 313 is executed, i.e., the first incremental term value $IHACSUB_1$ is subtracted from the integral control term $IAI_n$, only when the $PD_1$ switch has been turned on in the present loop and at the same time the feedback control is in a stable state after the HAC switch 34 was turned on.

At the step 314, it is determined whether or not the $PD_2$ switch 33 is ON, i.e., the discharge pressure $Pd_2$ is higher than the second predetermined value $PD_2$ ($> PD_1$). If the answer to the question of the step 314 is Yes, i.e., if the discharge pressure of the compressor 20 is extremely high, it is determined at a step 315 whether or not the present loop is the first loop after the $PD_2$ switch has been turned on, and at a step 316 whether or not the flag F.FBHAC has been set to 1. If both the answers to the questions of the steps 315 and 316 are Yes, the integral control term $IAI_n$ of the present loop is set to a value $(IAI_{n-1} - (IHACSUB_2 - IHACSUB_1))$ obtained by subtracting the difference between the second incremental term value $IHACSUB_2$ ($> IHACSUB_1$) and the first incremental term value $IHACSUB_1$ from the integral control term value $IAI_{n-1}$ of the immediately preceding loop (step 317), and then the program proceeds to a step 318 referred to hereinbelow. If either one of the answers to the questions of the steps 315 and 316 is No, the program jumps to the step 318. The reason for subtracting the first incremental term value $IHACSUB_1$ from the second incremental term value $IHACSUB_2$ at the step 317 is that the first incremental term value has already been subtracted from the integral control term $IAI_n$ at the above step 313.

At the step 318, the incremental term IHACSUB to be applied in the calculation of the valve opening command value ICMD when the discharge pressure of the compressor 20 is high is set to the second predetermined incremental term value $IHACSUB_2$. Then, a learned value $I_{XREF}$ of the integral control term $IAI_n$, described hereinbelow, is held at a value obtained on the latest occasion (step 319). Then at a step 320, the air-conditioner load term $IHAC_n$ of the present loop obtained at any one of the steps 305, 307, or 308, and the incremental term IHACSUB set at the step 318 are applied to the following equation to calculate the valve opening command value ICMD, followed by terminating the present program:

$$ICMD = IAI_n + IHAC_n + IHACSUB + I_x \qquad (2)$$

where $I_x$ includes a correction term set in accordance with generating conditions of an AC generator, not shown, of the engine, a proportional control term set in accordance with the difference between a desired idling engine rotational speed set in response to engine coolant temperature $T_W$ etc. and an actual engine rotational speed Ne, a correction term set in response to an actual variation of the engine rotational speed Ne, etc.

If the answer to the question of the step 314 is No, i.e. if $PD_1 < Pd \leq PD_2$ and therefore the discharge pressure of the compressor 20 is high, it is determined at a step 321 whether or not the present loop is the first loop after the $PD_2$ switch 33 has been turned off, and then at a step 322 whether or not the flag F.FBHAC has been set to 1. If both the answers to the questions of the steps 321 and 322 are Yes, the integral control term $IAI_n$ of the present loop is set, at a step 323, inversely to the step 317, to a value $(IAI_{n-1} + (IHACSUB_2 - IHACSUB_1))$ obtained by adding the difference between the second and first incremental term values $(IHACSUB_2 - IHACSUB_1)$ to the integral control term $IAI_{n-1}$ of the immediately preceding loop, and then the program proceeds to a step 324. If either one of the answers to the questions of the steps 321 and 322 is No, the program jumps to the step 324. At the step 324, the incremental term IHACSUB is set to the first incremental term value $IHACSUB_1$, and then the steps 319 et seq. are executed, followed by terminating the present program.

If the answer to the question of the step 310 is No, i.e. if $Pd \leq PD_1$ and therefore the discharge pressure of the compressor 20 is not high, it is determined at a step 325 whether or not the present loop is the first loop after the $PD_1$ switch 32 has been turned off, and then at a step 326 whether or not the flag F.FBHAC has been set to 1. If both the answers to the questions of the steps 325 and 326 are Yes, the integral control term $IAI_n$ of the present loop is set at a step 327 to a value obtained by adding the first incremental term value $IHACSUB_1$ to the integral control term $IAI_{n-1}$ of the immediately preceding loop, and then the program proceeds to a step 328. If either one of the answers to the questions of the steps 325 and 326 is No, the program jumps to the step 328. At the step 328, the incremental term IHACSUB is set to 0.

As described above, the incremental term IHACSUB is set to 0 (step 328) when the $PD_1$ switch 32 is OFF, i.e., when $Pd \leq PD_1$ and therefore the discharge pressure of the compressor 20 is not high. It is set to the first incremental term value $IHACSUB_1$ (step 324) when the $PD_1$ switch 32 is ON and at the same time the $PD_2$ switch 33 is OFF, i.e., when $PD_1 < Pd \leq PD_2$ and therefore the discharge pressure of the compressor 20 is high. It is set to the second incremental term value $IHACSUB_2$ (step 318) when the $PD_2$ switch 33 is ON, i.e., $Pd > PD_2$ and therefore the discharge pressure of the compressor 20 is very high. The incremental term value thus set is applied as an additive term value to the equation (2) by which the valve opening command value ICMD is calculated (see FIG. 5).

When the stroke $F_{STR}$ is in the vicinity of its maximum, the load torque on the engine 1 increases as the discharge pressure Pd increases, as shown in FIG. 1, since the pressure on the pistons 28 of the compressor 20 increases with rise in the discharge pressure Pd. Therefore, the incremental term IHACSUB is set to a greater value as the discharge pressure Pd is higher, depending on the ON/OFF states of the $PD_1$ and $PD_2$ switches 32, 33, whereby it is possible to increase the amount of intake air in accordance with increase in the load torque due to rise in the discharge pressure so as to carry out proper engine output control.

In this connection, as can be clearly understood from the steps 311 to 313, 315 to 317, 321 to 323, and 325 to 327, immediately after the $PD_1$ switch 32 or the $PD_2$ switch 33 has been switched and if then the flag F.FBHAC has been set to 1, the integral control term $IAI_n$ is so set as to offset the incremental term value IHACSUB and then applied to the equation (2). Therefore, the valve opening command value ICMD is not substantially changed (during time period $t_C$ to $t_D$ in (d) of FIG. 5). If the engine rotational speed control continues to be carried out in a feedback manner when the intake air amount is being stably increased after a predetermined time period has elapsed after the start of the compressor 20, the integral control term $IAI_n$, the proportional control term, etc. to be applied in the feedback control have already been increased so as to prevent lowering of the engine rotational speed caused by gradual increase in the discharge pressure of the refrigerant. Therefore, under such conditions, if the intake air amount is increased in synchronism with turning-on of the $PD_1$ switch 32 or the $PD_2$ switch 33, the increase in the intake air amount caused thereby will be excessive, to thereby cause a temporary overshooting of the engine rotational speed. In order to avoid this inconvenience, the integral control term $IAI_n$ for the feedback control which has been increased with rise in the discharge pressure Pd is decreased as described above to thereby remove the increase in the load torque produced by the compressor 20 from the feedback control term. Thus, it is possible to prevent overshooting of the engine rotational speed control due to a sudden increase in the intake air amount even if the discharge pressure Pd is increased, to thereby improve the stability of the engine rotational speed control. Further, on the other hand, when the discharge pressure Pd is decreased, it is possible to prevent engine stalling due to a sudden decrease in the intake air amount to thereby also improve the stability of the engine rotational speed control.

In the meanwhile, immediately after the $PD_1$ switch 32 or the $PD_2$ switch 33 has been switched and if at the same time the flag F.FBHAC has been set to 0, the integral control term $IAI_n$ is held at the value of the immediately preceding loop. Therefore, the valve opening command value ICMD is instantly increased or decreased by the incremental term IHACSUB (at time points $t_G$, $t_H$ in (d) of FIG. 5). Thus, if the discharge pressure Pd is increased or decreased soon after the start of the compressor 20 while the intake air is not stably increased, it is possible to increase or decrease the intake air amount instantly to thereby improve the responsiveness of the control.

At a step 329 following the step 328, it is determined whether or not the stroke $F_{STR}$ is in a predetermined range, i.e., it is higher than a lower predetermined value $F_{STRL}$ and at the same time lower than a higher predetermined value $F_{STRH}$. If the answer to the question of the step 329 is Yes, i.e., if $F_{STRL} < F_{STR} < F_{STRH}$, the program proceeds to a step 330 wherein the learned value $I_{XREF}$, which is set as an initial value of the integral control term $IAI_n$ to be applied at the start of the feedback control, is calculated in accordance with the following equation (3), and then the program proceeds to the step 320.

$$I_{XREF} = C_{REF}/A \times IAI_n + (A - C_{REF})/A \times I_{XREF} \quad (3)$$

where A represents a constant, $C_{REF}$ a weighting factor set in accordance with a subroutine, not shown, and $I_{XREF}$ is a learned value obtained on the latest occasion. As is clear from the above equation (3), the weighting factor $C_{REF}$ determines the weight or significance of the integral control term $IAI_n$ of the present loop in calculating the learned value $I_{XREF}$.

If the answer to the question of the step 329 is No, i.e., if $F_{STR} \geq F_{STRH}$ or $F_{STR} \leq F_{STRL}$, the steps 319 et seq. are executed, followed by terminating the present program.

The predetermined value $F_{STRH}$ is set at a value slightly smaller than that indicated by the one-dot chain line in FIG. 1, for instance, at 65% of the maximum stroke $F_{STRmax}$. In the region where the stroke is smaller than the predetermined value $F_{STRH}$, the amount of load torque produced by the compressor 20 can be determined almost by the stroke $F_{STR}$ alone, and an intake air amount corresponding to the thus increased load torque is applied by means of the additive term IHAC or IHACAC in calculation of the valve opening command value ICMD. Therefore, the load produced by the compressor 20 does not affect the feedback control term $IAI_n$. That is, the load externally applied on the engine 1 is excluded from the integral control term $IAI_n$ so that the integral control term $IAI_n$ corresponds to the amount of intake air required when there is no external load.

On the other hand, in the region where the stroke $F_{STR}$ is equal to or lower than the predetermined value $F_{STRL}$, the output of the $F_{STR}$ sensor 31 is not linear to the actual stroke, and therefore the correct learned value $I_{XREF}$ cannot be obtained from the integral control term $IAI_n$. This is why the learned value $I_{XREF}$ is not calculated when $F_{STR} \leq F_{STRL}$.

Therefore, as described above, the learned value $I_{XREF}$ is calculated only when the stroke $F_{STR}$ is smaller than the predetermined value $F_{STRH}$ but greater than $F_{STRL}$, whereby it is possible to prevent the learned value $I_{XREF}$ from being drastically changed and calculate same to a proper value.

If the answer to the question of the step 303 is No, i.e., if the HAC switch 34 is OFF and therefore the compressor 20 is not in operation, the flag F.FBHAC is set to 0 at a step 331, and then it is determined at a step 332 whether or not the present loop is the first loop after the HAC switch 34 has become OFF. If the answer to the question of the step 332 is Yes, the air-conditioner load term $IHAC_n$ of the present loop is set to the third predetermined value IHACDC at a step 333, and then the program proceeds to the steps 328 et seq. By thus setting the air-conditioner load term $IHAC_n$ of the present loop to the third predetermined value IHACDC, which is a negative value, immediately after the HAC switch 34 has been turned off, the amount of intake air remaining in the intake pipe immediately after the turning-off of the HAC switch 34 is offset.

If the answer to the question of the step 332 is No, i.e., if the HAC switch 34 was turned off in or before the immediately preceding loop, it is determined at a step 334 whether or not the air-conditioner load term $IHAC_{n-1}$ of the immediately preceding loop is smaller than 0. If the answer to the question of the step 334 is Yes, i.e., if $IHAC_{n-1} < 0$, the air-conditioner load term $IHAC_n$ of the present loop is set at a step 335 to a value obtained by adding a predetermined value $\Delta IHACDC$ to the air-conditioner load term $IHAC_{n-1}$ of the immediately preceding loop, and then the program proceeds to the steps 328 et seq. If the answer to the question of the step 334 is No, i.e., if $IHAC_{n-1} \geq 0$, the program jumps to the step 328. Thus, the air-conditioner load term $IHAC_n$ is set to the third predetermined value IHACDC, which is a negative value, immediately after the HAC switch 34 has been turned off, and then this value is gradually increased until it is finally set at 0 (during time period $t_E - t_F$ in FIG. 5).

Although in the first embodiment described above the load torque is detected based upon the piston stroke and discharge pressure of the compressor, this is not limitative to the invention, but the load torque may be detected based upon another or other parameter(s) reflecting the load torque.

Figure 6:
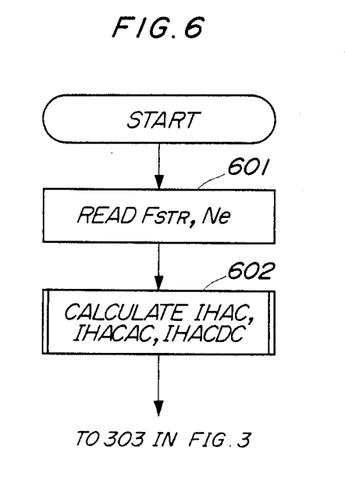
FIG. 6 is a partial flowchart showing part of a subroutine for calculating the valve opening command value ICMD according to a second embodiment of the invention, which is different from the corresponding part of the subroutine according to the first embodiment of the invention.

Next, the second embodiment of the invention will be described. This embodiment is distinguished from the first embodiment described above in that the valve opening command value ICMD is determined based upon the engine rotational speed Ne as well as the piston stroke and discharge pressure of the compressor. That is, the second embodiment is particularly effective if applied in other operating regions of the engine than the idling region, where the engine rotational speed changes over a wide range. In the second embodiment, the valve opening command value ICMD is calculated in accordance with a subroutine which is similar to that shown in FIG. 3, but in which only the steps shown in of FIG. 6 are different from the corresponding ones of the subroutine shown in FIG. 3.

Figure 7:
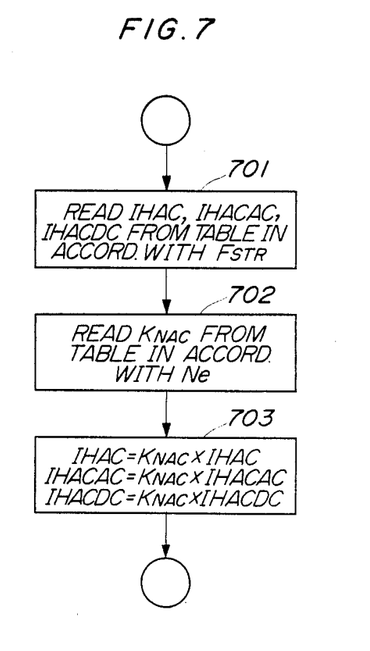
FIG. 7 is a flowchart of a subroutine for calculating an air conditioner load term applied in the second embodiment of the invention.

At a step 601 corresponding to the step 301 in FIG. 3 of the first embodiment, the piston stroke $F_{STR}$ and the engine rotational speed Ne are read. Then at a step 602 corresponding to the step 302 in FIG. 3, calculations are made of the first to third predetermined values IHAC, IHACAC, and IHACDC for setting the air-conditioner load term $IHAC_n$ to be applied in calculating the valve opening command value ICMD. FIG. 7 shows a subroutine for calculating the predetermined values IHAC, IHACAC, and IHACDC. First at a step 701, the first to third predetermined values IHAC, IHACAC, and IHACDC are read from a table stored in the memory means 5c in accordance with the stroke $F_{STR}$ read at the step 601 of FIG. 6.

Figure 8:
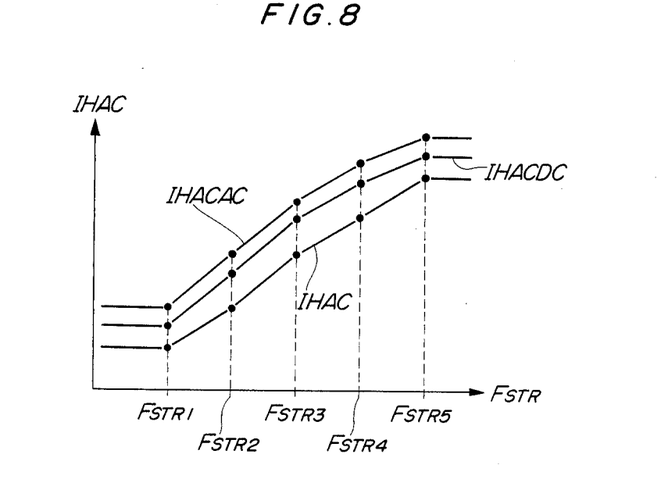
FIG. 8 is a diagram illustrating a table of the air-conditioner load term applied in executing the subroutine of FIG. 7.

FIG. 8 shows this table, wherein the first and second predetermined values IHAC and IHACAC are positive values, whereas the third predetermined value IHACDC is a negative value. Further, the absolute value of each predetermined value is greater as the stroke $F_{STR}$ is greater. This is to set the intake air amount in accordance with the load torque vs. stroke characteristic to the load torque is approximately proportional to the stroke $F_{STR}$ except in the vicinity of the full stroke.

Further, the second predetermined value IHACAC is greater than the first predetermined value IHAC with respect to the same stroke $F_{STR}$. More specifically, with respect to five predetermined values $F_{STR1}$ to $F_{STR5}$ (e.g. 5%, 20%, 50%, 70% and 80% of the full stroke, respectively) of the stroke $F_{STR}$, IHAC is set to 3%, 5%, 8%, 10%, and 12% of the maximum opening, IHACAC to 4%, 6%, 10%, 12%, and 14% of same, and IHACDC to 0%, −1%, −1%, −2% and −2% of same, respectively. If the stroke assumes a value between the above predetermined values, IHAC, IHACAC, and IHACDC are determined by interpolation.

Figure 9:
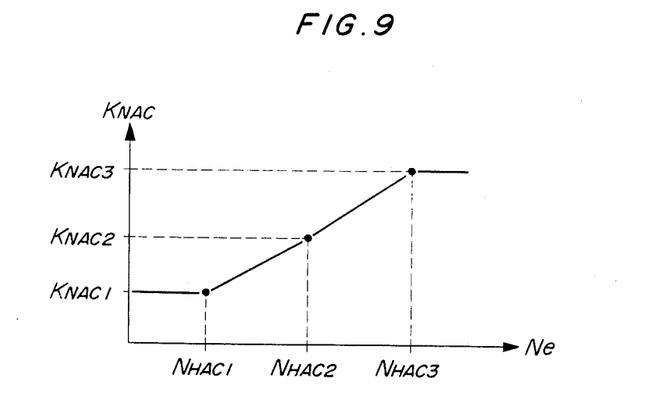
FIG. 9 is a diagram showing a table of an engine rotational speed correction coefficient $K_{NAC}$ applied in executing the subroutine of FIG. 7.

Referring again to FIG. 7, at a step 702 following the step 701, an engine rotational speed-dependent correction coefficient $K_{NAC}$ is read from a table stored in the memory means 5c in accordance with the engine rotational speed Ne read at the step 601 of FIG. 6. FIG. 9 shows this table. The engine rotational speed-dependent correction coefficient $K_{NAC}$ is greater as the engine rotational speed Ne is higher. More specifically, there are provided first to third predetermined values $N_{HAC1}$ to $N_{HAC3}$ (e.g. 1,000 rpm, 1,500 rpm, and 2,000 rpm, respectively) of the engine rotational speed Ne. When the engine rotational speed Ne is not higher than the first predetermined value $N_{HAC1}$, the engine rotational speed-dependent correction coefficient $K_{NAC}$ is set to a first or smallest predetermined value $K_{NAC1}$ (e.g., 1.0). When the engine rotational speed Ne is equal to the second predetermined value $N_{HAC2}$, the correction coefficient $K_{NAC}$ is set to a second predetermined value $K_{NAC2}$ (e.g., 2.0), which is greater than the first predetermined value $K_{NAC1}$. When the engine rotational speed Ne is not lower than the third predetermined value $N_{HAC3}$, the correction coefficient $K_{NAC}$ is set to a third predetermined value $K_{NAC3}$ (e.g., 3.0), which is greater than the second predetermined value $K_{NAC2}$. If the engine rotational speed Ne falls between the above predetermined values, the correction coefficient $K_{NAC}$ is determined by interpolation.

Referring again to FIG. 7, at a step 703 following the step 702, the first to third predetermined values IHAC, IHACAC, and IHACDC obtained at the step 701, and the engine rotational speed-dependent correction coefficient $K_{NAC}$ obtained at the step 702 are applied to the following equations (4), (5), and (6) to calculate the predetermined values IHAC, IHACAC, and IHACDC:

$$IHAC = K_{NAC} \times IHAC \quad (4)$$

$$IHACAC = K_{NAC} \times IHACAC \quad (5)$$

$$IHACDC = K_{NAC} \times IHACDC \quad (6)$$

The values of IHAC, IHACAC, and IHACDC thus determined are set as the air-conditioner load term $IHAC_n$, when the compressor 20 is in steady operation, immediately after it has started operation, and immediately after it has stopped operation, respectively. The air-conditioner load term $IHAC_n$ thus set is applied as an additive term in calculation of the valve opening command value ICMD. Therefore, the intake air amount is controlled depending on the operation or stoppage of the compressor 20 not only in accordance with the stroke $F_{STR}$ but also in response to the engine rotational speed Ne, whereby it is possible to control the output torque of the engine 1 in response to variation of the load torque produced by the compressor 20, to thereby prevent torque shock or fluctuation of the engine rotational speed Ne.

Further, the engine rotational speed-dependent correction coefficient $K_{NAC}$ is set based on the table of FIG. 9 as described above. More specifically, the first to third predetermined values IHAC, IHACAC, and IHACDC are so corrected that the absolute values thereof become greater as the engine rotational speed Ne is higher, and therefore the incremental or decremental amount of the intake air responsive to operation or stoppage of the compressor 20 is controlled to a greater absolute value. Thus, it is possible to control the intake air amount in a manner suitable to the above mentioned load torque characteristic that the load torque is approximately proportional to the engine rotational speed Ne, to thereby control the output torque of the engine 1 in a more suitable manner.

In the embodiments described above, the output torque of the engine is controlled by controlling the intake air amount. However, this is not limitative, but the engine output may be controlled by another method, e.g. fuel supply control, ignition timing control, etc.

What is claimed is:

1. In an output control system for an internal combustion engine for an automotive vehicle having a compressor installed therein and driven by said engine, said compressor having capacity thereof being variable, said output control system having engine output-increasing means for increasing output torque of said engine by means of an engine output incremental value in response to operation of said compressor, the improvement comprising:

load torque-detecting means for detecting load torque produced by said compressor; and incremental value-setting means for setting said engine output incremental value outputted from said engine output-increasing means, depending on output from said load torque-detecting means.

2. An output control system according to claim 1, wherein said compressor has pistons having a stroke thereof being variable to vary the capacity of said compressor, said load torque-detecting means comprising stroke-detecting means for detecting the stroke of said pistons.

3. An output control system according to claim 1, wherein said compressor has pistons having a stroke thereof being variable to vary the capacity of said compressor, said load torque-detecting means comprising stroke-detecting means for detecting the stroke of said pistons, and discharge pressure-detecting means for detecting discharge pressure of said compressor.

4. An output control system according to claim 2, wherein said incremental value-setting means sets said engine output incremental value in accordance with the stroke of said pistons when the stroke of said pistons is smaller than a predetermined value.

5. An output control system according to claim 3, wherein said incremental value-setting means sets said engine output incremental value in accordance with the stroke of said pistons when the stroke of said pistons is smaller than a predetermined value, and in accordance with the discharge pressure of said compressor when the stroke of said pistons is equal to or greater than said predetermined value, respectively.

6. In an output control system for an internal combustion engine for an automotive vehicle having a compressor installed therein and driven by said engine, said compressor having capacity thereof being variable, said output control system having engine output-increasing means for increasing output torque of said engine by means of an engine output incremental value in response to operation of said compressor, the improvement comprising:

load torque-detecting means for detecting load torque produced by said compressor;

engine rotational speed-detecting means for detecting the rotational speed of said engine; and incremental value-setting means for setting said engine output incremental value outputted from said engine output-increasing means, depending on output from said load torque-detecting means and output from said engine rotational speed-detecting means.

7. An output control system according to claim 6, wherein said compressor has pistons having a stroke thereof being variable to vary the capacity of said compressor, said load torque-detecting means comprising stroke-detecting means for detecting the stroke of said pistons.

8. An output control system according to claim 6, wherein said compressor has pistons having a stroke thereof being variable to vary the capacity of said compressor, said load torque-detecting means comprising stroke-detecting means for detecting the stroke of said pistons, and discharge pressure-detecting means for detecting discharge pressure of said compressor.

9. An output control system according to any one of claims 6–8, wherein said incremental value-setting means sets said engine output incremental value to a greater value as the engine rotational speed detected by said engine rotational speed-detecting means is higher.

10. An output control system according to claim 8, wherein said incremental value-setting means sets said engine output incremental value in accordance with the stroke of said pistons when the stroke of said pistons is smaller than a predetermined value, and in accordance with the discharge pressure of said compressor when the stroke of said pistons is equal to or greater than said predetermined value, respectively.

11. An output control system according to any one of claims 2, 3, 7 or 8, wherein said engine output incremental value comprises an initial incremental value (IHACAC) which is generated in synchronism with start of the operation of said compressor and increased in accordance with increase in the stroke of said pistons, a reference incremental value (IHAC) which is gradually decreased from said initial incremental value until it reaches a value large enough to offset the load torque produced by said compressor.

12. An output control system according to claim 3 or claim 8, wherein said engine output incremental value is determined by the sum of stroke-dependent correction term (IHAC, IHACAC) determined by the stroke of said pistons and discharge pressure-dependent correction term (IHACSUB) determined by the discharge pressure of said compressor.

13. An output control system according to claim 12, including idling engine rotational speed feedback control means for controlling the rotational speed of said engine in a feedback manner to a desired idling engine rotational speed when said engine is at-idle, and output-increasing correction-nullifying means for nullifying output torque-increasing correction by said discharge pressure-dependent correction term when said discharge pressure-dependent correction term assumes a value other than zero during operation of said idling engine rotational speed feedback control means.

14. An output control system according to any one of claims 1–4, 6–8 or 10, wherein said engine output-increasing means increases an amount of intake air supplied to said engine.

15. An output control system according to claim 9, wherein said engine output-increasing means increases an amount of intake air supplied to said engine.

16. An output control system according to claim 9, wherein said engine output incremental value comprises an initial incremental value (IHACAC) which is generated in synchronism with start of the operation of said compressor and increased in accordance with increase in the stroke of said pistons, a reference incremental value (IHAC) which is gradually decreased from said initial incremental value until it reaches a value large enough to offset the load torque produced by said compressor.

* * * * *